United States Patent Office 2,811,533
Patented Oct. 29, 1957

2,811,533

CARBONATO NITRILES

William L. Riedeman, Philadelphia, Pa., assignor to Rohm & Haas Company, Philadelphia, Pa., a corporation of Delaware No Drawing. Application April 6, 1954,
Serial No. 421,440

4 Claims. (Cl. 260—340.2)

This invention relates to carbonato nitriles of the fatty acids which contain 16 to 22 carbon atoms. It relates to those nitriles which contain 16 to 22 carbon atoms and also contain one or more groups having the formula

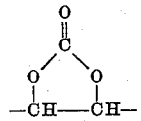

More particularly it relates to carbonato stearonitrile having the formula

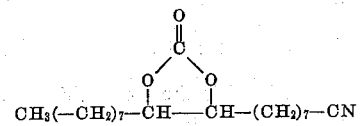

It also relates to the preparation and use of the carbonato nitriles.

The compounds of this invention are ususually high boiling liquids which are highly compatible with a wide variety of plastic materials. By virtue of the presence of the carbonato groups in the fatty acid chains, they are far more compatible with plastic materials, such as cellulosic esters and vinyl halide resins, than are the corresponding nitriles which do not containing carbonato groups. Accordingly, they are recommended for use as plasticizers in plastic compositions.

The products of this invention can be made by at least two methods. In one process, phosgene is reacted with a nitrile containing at least two hydroxyl groups on adjacent carbon atoms. Hydrogen chloride is split out and, therefore, the reaction is best carried out in the presence of an acceptor for hydrogen chloride. In another process, the same kind of polyhydroxylated nitrile is reacted with a dialkyl carbonate, such as dimethyl carbonate or diethyl carbonate, by ester-interchange in the presence of a catalyst, such as metallic sodium or alkali metal alkoxides. In either process, the starting material is a nitrile which contains one or more pairs of hydroxyl groups on adjacent carbon atoms of the aliphatic chain. Such polyhydroxy nitriles are made by known methods. For example, a nitrile of an unsaturated acid which contains one or more double bonds is reacted with hydrogen peroxide and a large excess of formic acid or acetic acid whereby an hydroxy-acyloxy derivative is produced. This, in turn, is converted to the polyhydroxy compound by hydrolysis of the acyloxy group or by alcoholysis.

It is now evident that the starting material is a nitrile of an acid which contains 16 to 22 carbon atoms and also contains one or more double bonds. Typical of such nitriles are oleonitrile, eruconitrile, elaeostearonitrile, linoleonitrile, linolenonitrile, clupanodononitrile, and palmitoleonitrile. All occur in animal and vegetable oils, for example, in soybean, rapeseed, linseed, sardine and whale oils, and are readily obtained by the hydrolysis of the naturally occurring oils. This invention also embraces mixtures of nitriles such as those made from a mixture of fatty acids. Since all of these nitriles contain aliphatic unsaturation, they can readily be converted first to the polyhydroxy derivative and thereafter to the carbonato products. It is preferred that all of the double bonds in any given nitrile by converted to carbonato groups. It has been found, however, that the carbonato group imparts to a nitrile such greatly enhanced solubility in, and compatibility with, plastic materials, particularly of the vinyl resin type, that it is not essential that every double bond be converted to a carbonato group. It is essential, however, that at least one double bond in each nitrile be thus converted.

The carbonato nitrile which has the greatest commercial promise at the moment is 9,10-carbonatostearonitrile having the formula

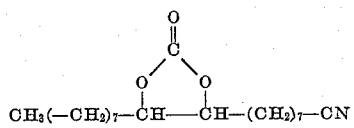

The reaction of phosgene with the polyhydroxy nitriles is best carried out at a temperature from $-10°$ C. to the boiling point of the reaction mixture. In commercial practice, it is preferred to carry out the reaction at a temperature from about $-10°$ C. to about $60°$ C. because of the volatility of the phosgene. The phosgene may be bubbled into the nitrile; but a more satisfactory method appears to be that of reacting the nitrile with a solution of phosgene in an organic liquid, such as benzene, which is a solvent for the nitrile. It is most desirable that a mildly basic acceptor for hydrogen chloride be present; and for this purpose tertiary amines and weakly basic anion-exchange resins have each been used. Pyridine is very effective and its use is recommended at lower temperatures while anion-exchange resins are best used at higher temperatures. Other tertiary amines which can be used like pyridine include quinoline, isoquinoline, dimethylaniline, diethylaniline, trimethylamine, triethylamine, tri-n-butylamine, and the like. What is desired is that an acceptor be present which will take up the hydrogen chloride as fast as it is formed. In the process of preparing the carbonato nitriles by ester-interchange, the nitrile is reacted with an alkyl carbonate at a temperature which is high enough to cause the alcohol to distill out of the reaction mixture. Here, as in the phosgene reaction, the use of a solvent, such as an aromatic hydrocarbon, is recommended or in excess of the alkyl carbonate itself may serve as a solvent. Alkali metals, such as sodium and potassium, serve as excellent catalysts. Metal alkoxides have also been used.

The property which makes the products of this invention so efficient as plasticizers, particularly for vinyl halide resins, is their stability in plastic compositions. They are readily dispersed in plastic compositions and thereafter remain permanently in the compositions. They are not easily extracted by means of solvents or aqueous solutions and they do not tend to migrate to the surfaces of such compositions. At the same time, they impart a high degree of flexibility which is retained even at low temperatures. The vinyl resins which can be plasticized to advantage with the carbonato nitriles of this invention are more properly defined as "vinyl halide resins" and this term is herein used to embrace the following: polymers of vinyl halide, such as vinyl chloride and vinyl bromide; copolymers of a vinyl halide and a vinyl ester of the lower aliphatic acid, such as copolymers of vinyl chloride and vinyl acetate or vinyl propionate; copolymers of vinyl halides, such as vinyl chloride and vinylidene halides, such as vinylidene chloride; and copolymers of a vinyl halide with other copolymerizable compounds containing a vinylidene group, $CH_2=C<$, such as ethyl acrylate, methyl methacrylate and the like. Preferred resins of this type are those which contain from about 60 to about 95% of copolymerized vinyl chloride and 5% to 40% of another copolymerized vinylidene compound.

The following examples are intended to illustrate the manner in which the compounds of this invention may be made. The examples are drawn to the preparation and use of 9,10-carbonatostearonitrile; but it is to be understood that the other nitriles embraced by this invention are prepared in the same manner and are employed in the same way in plastic compositions.

*Example 1*

Into a reactor equipped with thermometer, agitator, and condenser were charged 79 grams of 9,10-dihydroxystearonitrile (0.267 mol), 47.2 grams of diethyl carbonate and a small piece of metallic sodium. The stirred mixture was heated to 96 C. and held at the boiling point until the liberation of ethyl alcohol ceased. The mixture was then cooled to room temperature and was dissolved in 750 ml. of benzene. The solution was thoroughly washed with water and concentrated on a steam bath under a vacuum. The resultant oil was twice fractionally distilled and 63 grams of an oil was collected which boiled at 228–234° C./0.1 mm. Its index of refraction ($n_D^{25}$) was 1.4630 and its analysis corresponded to that of 9,10-carbonatostearonitrile (percent C: theory=74.54, analysis=70.38; percent H: theory=10.29, analysis=10.13; percent N: theory=4.33, analysis 4.17).

*Example 2*

A mixture of 70 grams of dihydroxystearonitrile (0.235 mol), 200 grams of benzene and 110 grams of a commercially available, weakly basic anion-exchange resin was placed in a reactor equipped with thermometer, stirrer, reflux condenser and dropping funnel. To the stirred mixture was added dropwise over a period of about 30 minutes a solution of 47 grams of phosgene dissolved in 150 grams of benzene. The temperature rose to about 42° C. and after the addition of phosgene the mixture was maintained at 50° C. for 2.75 hours. The anion-exchange resin was removed by filtration and the filtrate was washed, concentrated, and distilled as in Example 1. The product was essentially identical with the product of the first example.

The carbonatostearonitrile was found to be compatible with the above-noted vinyl halide resins and to serve as plasticizers for the latter. Dried films of the blends were uniformly transparent. Such compositions are claimed in U. S. Patent No. 2,755,264, which issued on continuation-in-part application Serial No. 472,501 filed December 1, 1954.

I claim:

1. A carbonato nitrile of a fatty acid which contains 16 to 22 carbon atoms and which also contains one to three substituent groups having the structure

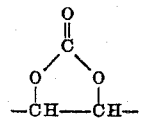

2. A process for preparing carbonato nitriles which comprises reacting, at a temperature from about −10° C. to about the boiling point of the reaction mixture in the presence of an hydrogen chloride acceptor, phosgene and a fatty acid nitrile which contains 16 to 22 carbon atoms and which also contains at least one pair of hydroxyl groups on adjacent carbon atoms.

3. A process for preparing carbonatostearonitrile which comprises reacting, at a temperature from about −10° C. to about the boiling point of the reaction mixture in the presence of an hydrogen chloride acceptor, phosgene and 9,10-dihydroxystearonitrile.

4. 9,10-carbonatostearonitrile.

References Cited in the file of this patent

UNITED STATES PATENTS

| | | |
|---|---|---|
| 921,944 | Berendes | May 18, 1909 |
| 1,995,291 | Carothers | Mar. 26, 1935 |
| 2,316,371 | Strother | Apr. 13, 1943 |
| 2,527,240 | Baird | Oct. 24, 1950 |
| 2,601,255 | Bruson | June 24, 1952 |
| 2,667,497 | Cline | Jan. 26, 1954 |